United States Patent
Soryal (10) Patent No.: US 12,401,662 B2
(45) Date of Patent: Aug. 26, 2025

(54) ENCRYPTED APPLICATIONS VERIFICATION

(71) Applicant: AT&T Intellectual Property I, L.P., Atlanta, GA (US)

(72) Inventor: Joseph Soryal, Glendale, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 192 days.

(21) Appl. No.: 17/564,767

(22) Filed: Dec. 29, 2021

(65) Prior Publication Data

US 2023/0208856 A1 Jun. 29, 2023

(51) Int. Cl.
*H04L 9/40* (2022.01)

(52) U.S. Cl.
CPC ...... *H04L 63/1416* (2013.01); *H04L 63/0236* (2013.01); *H04L 63/1425* (2013.01); *H04L 63/20* (2013.01)

(58) Field of Classification Search
CPC ....... H04L 63/14; H04L 63/20; H04L 63/123; H04L 63/0227; H04L 63/0236; H04L 63/1425; H04L 9/32; H04L 9/40; G06F 9/54; G06F 21/577
USPC .......................................................... 726/22
See application file for complete search history.

(56) References Cited

U.S. PATENT DOCUMENTS

| | | | | |
|---|---|---|---|---|
| 11,416,587 | B1* | 8/2022 | Den Hartog | G06F 21/53 |
| 2007/0074282 | A1* | 3/2007 | Black | H04L 63/166 |
| | | | | 726/14 |
| 2010/0275026 | A1* | 10/2010 | Mclean | G06F 21/12 |
| | | | | 713/176 |
| 2011/0085667 | A1* | 4/2011 | Berrios | H04L 9/3249 |
| | | | | 709/203 |
| 2015/0134969 | A1* | 5/2015 | Kim | H04L 9/3242 |
| | | | | 713/176 |
| 2017/0078099 | A1* | 3/2017 | Lester | H04L 63/0838 |
| 2017/0230414 | A1* | 8/2017 | Kamble | H04L 63/101 |
| 2018/0048475 | A1* | 2/2018 | Lester | H04L 5/0037 |
| 2018/0131521 | A1* | 5/2018 | Yang | H04L 9/3265 |
| 2019/0052467 | A1* | 2/2019 | Bettger | H04L 9/0643 |
| 2019/0089678 | A1* | 3/2019 | Lam | H04L 63/0263 |
| 2019/0158537 | A1* | 5/2019 | Miriyala | G06F 21/606 |
| 2020/0242251 | A1* | 7/2020 | Wisgo | G06F 21/564 |
| 2020/0389487 | A1* | 12/2020 | Zhauniarovich | H04L 63/1491 |
| 2022/0337604 | A1* | 10/2022 | Kim | H04L 63/0281 |

(Continued)

*Primary Examiner* — James N Fiorillo
(74) *Attorney, Agent, or Firm* — Hartman & Citrin LLC (57) ABSTRACT

Concepts and technologies disclosed herein are directed to encrypted applications verification. According to one aspect disclosed herein, a device can execute an application verification module to perform operations. The device can receive a hash function from a master security server. The hash function can be used to verify an application installed on the device. The device can apply the hash function to application code of the application to determine a hash result. The master security server can determine whether the application is verified based upon the hash result. The device can execute the application thereby generating data traffic to be sent via a network to a destination. The device can provide the data traffic to the network. A network node can receive the data traffic and can allow or deny the data traffic access to the destination based upon a command received from the master security server.

19 Claims, 7 Drawing Sheets

(56) References Cited

U.S. PATENT DOCUMENTS

| | | | |
|---|---|---|---|
| 2023/0006968 A1* | 1/2023 | Catz | H04L 63/0209 |
| 2023/0056432 A1* | 2/2023 | Wu | H04W 12/069 |

* cited by examiner

ENCRYPTED APPLICATIONS VERIFICATION

BACKGROUND

The majority of connected devices operate on end-to-end encryption that makes it nearly impossible for a network operator to verify the legitimacy of an application or know whether or not the application is allowed. Technologies such as iCloud® Private Relay (available from Apple Inc.) and virtual private networks ("VPNs") functionally change Internet service providers into dumb pipes that are not privy to the data traversing their networks. These technologies can pose a major security risk for connected devices if a valid application is replaced by a malicious application. Moreover, because the encryption is end-to-end, intermediate network nodes would not know that the malicious application was transferred within the encrypted traffic.

SUMMARY

Concepts and technologies disclosed herein are directed to encrypted applications verification. According to one aspect of the concepts and technologies disclosed herein, a device can include a processor and a memory. The memory can include an application verification module comprising instructions that, when executed by the processor, cause the processor to perform operations. The device can receive a hash function from a master security server. The hash function can be used to verify an application installed on the device. The device can apply the hash function to application code of the application to determine a hash result. The device can provide the hash result to the master security server. The master security server can determine whether the application is verified based upon the hash result. The device can execute the application thereby generating data traffic to be sent via a network to a destination. The device can provide the data traffic to the network. A network node can receive the data traffic and can allow or deny the data traffic access to the destination based upon a command received from the master security server.

In some embodiments, the master security server can periodically update the hash function. In some embodiments, the device can receive a second hash function. The second hash function can replace the hash function.

In some embodiments, the second hash function can be used to verify a second application installed on the device. The device can apply the second hash function to a second application code of the second application to determine a second hash result. The device can provide the second hash result to the master security server. The master security server can determine whether the second application is verified based upon the second hash result. The device can execute the second application thereby generating second data traffic to be sent via the network to a second destination. The device can provide the second data traffic to the network. The network node can receive the second data traffic and can allow or deny the second data traffic access to the second destination based upon a second command received from the master security server.

The device can generally be any computing device that is capable of executing an application via one or more processors. In some embodiments, the device is or includes an Internet of Things ("IoT") device. In other embodiments, the device is or includes a smartphone. In still other embodiments, the device is or includes a computer.

According to another aspect of the concepts and technologies disclosed herein, a master security server can include a processor and a memory. The memory can include instructions that, when executed by the processor, cause the processor to perform operations. In particular, the master security server can determine a hash function to verify an application installed on a device, such as an IoT device, a smartphone, or a computer. The device can have an application verification module stored thereon. The master security server can provide the hash function to the device. The application verification module can apply the hash function to application code of the application to determine a hash result. The master security server can determine whether the hash result received from the device matches a stored hash result for the application. The master security server can generate a command directed to a network node. The command can instruct the network node to allow or deny data traffic associated with the application. The master security server can then provide the command to the network node.

In some embodiments, the master security server can periodically update the hash function. In some embodiments, the master security server can determine a second hash function to the device and can provide the second hash function to the device. In some embodiments, the second hash function can replace the hash function. The application verification module installed on the device can apply the second hash function to the application code of the application to determine a second hash result. In some embodiments, the second hash function can be used to verify a second application installed on the device.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description and be within the scope of this disclosure.

DETAILED DESCRIPTION

The concepts and technologies disclosed herein are directed to encrypted application verification. According to one aspect disclosed herein, a network operator can ensure that a verified application is running on a device instead of a malicious application or compromised application. Devices operating on the network are ensured to run only verified applications; otherwise, data traffic to and from these devices can be blocked.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1:
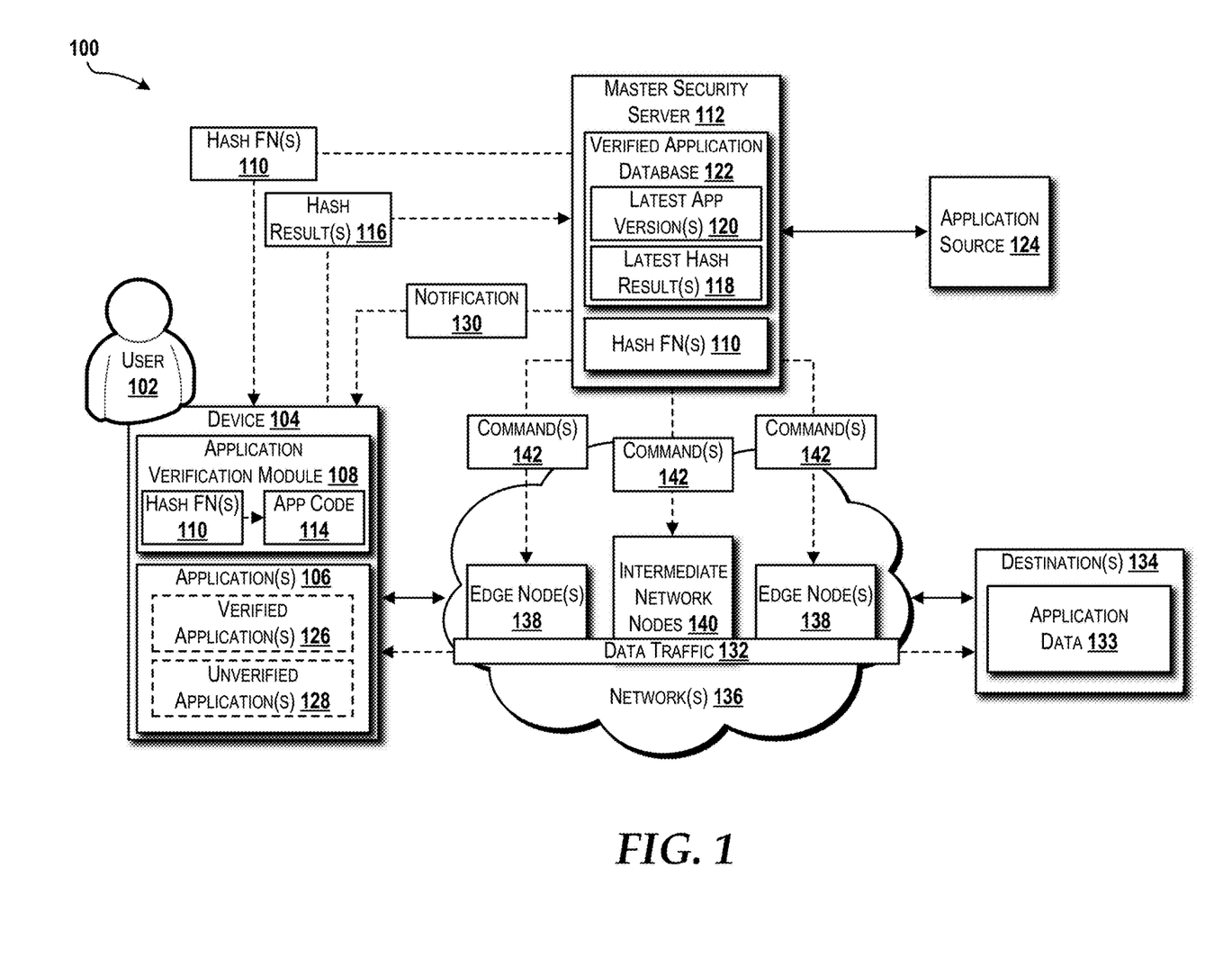
FIG. 1 is a block diagram illustrating aspects of an illustrative operating environment for various concepts and technologies disclosed herein.

Turning now to FIG. 1, an operating environment 100 in which aspects of the concepts and technologies disclosed herein can be implemented will be described. The operating environment 100 includes a user 102 who is associated with a device 104. The device 104 can generally be any computing device that is capable of executing one or more applications 106 via one or more processors (best shown in FIGS. 4 and 5). More particularly, the device 104 can be or can include a smartphone, a tablet, a computer, a smart device (e.g., a smartwatch, a fitness device, or the like), an IoT device, and the like. In some embodiments, the device 104 is configured the same as or similar to a computer system 400 described herein with reference to FIG. 4. In some other embodiments, the device 104 is configured the same as or similar to a mobile device 500 described herein with reference to FIG. 5.

The device 104 can also execute an application verification module 108 to perform operations. In particular, the device 104 can receive one or more hash functions 110 from a master security server 112. Each of the hash functions 110 can be assigned to a particular one of the applications 106 to be executed by the device 104. The application verification module 108 can apply the hash functions 110 to application code 114 associated with the applications 106 to determine hash results 116. The device 104 can then send the hash results 116 to the master security server 112. The master security server 112, in turn, can compare the hash results 116 with latest hash results 118. The master security server 112 can determine the latest hash results 118 by applying the hash functions 110 to latest application versions 120 of the applications 106 installed on the device 104. The latest application versions 120 and the latest hash results 118 can be stored, for example, in a verified application database 122. The master security server 112 can obtain the latest application versions 120 from an application source 124, such as a website or application marketplace.

In the illustrated example, the device 104 has one or more verified applications 126 and one or more unverified applications 128. A verified application 126 is an application 106 for which the hash result 116 matches the latest hash result 118 stored on the master security server 112. An unverified application 128 is an application for which the hash result 116 does not match the latest hash result 118 stored on the master security server 112. The master security server 112 can provide a notification 130 to the device 104 to warn the device 104 that an unverified application 128 is installed. The user 102 can then take the steps necessary to delete the unverified application 128 from the device 104. Alternatively, the notification 130 can include instructions for the device 104 to automatically delete the unverified application 128.

The applications 106 can generate data traffic 132 directed to one or more destinations 134. The destinations 134 can be or can include smartphones, tablets, computers, smart devices (e.g., smartwatches, fitness devices, or the like), IoT devices, and the like. The destinations 134 can be or can include websites, web servers, application servers, cloud networks, and the like. The destinations 134 can provide application data 133 to the application(s) 106 executed by the device 104. For example, a video streaming application can request streaming video data from the destination(s) 134, such as a video server operating in a data center. The application data 133 can include any other data exchanged between the device 104 and the destination(s) 134. In some embodiments, the destinations 134 are configured the same as or similar to a computer system 400 described herein with reference to FIG. 4. In some other embodiments, the destinations 134 are configured the same as or similar to a mobile device 500 described herein with reference to FIG. 5.

The applications 106 can attempt to send the data traffic 132 to the destination(s) 134 via one or more networks 136. The network(s) 136 can be or can include one or more private networks, one or more public networks, one or more public land mobile networks ("PLMNs"), one or more packet data networks ("PDNs") (e.g., the Internet), one or more wireless local area networks ("WLANs"), one or more wireless wide area networks ("WWANs"), combinations thereof, and/or the like. The network(s) 136 can be embodied, at least in part, as a network 600 illustrated and described herein with reference to FIG. 6. The network(s) 136 can include one or more network nodes, such as, in the illustrated example, one or more edge nodes 138 and one or more intermediate network nodes 140. The edge nodes 138 can be or can include gateways, firewalls, edge routers, and the like. The intermediate network nodes 140 can be or can include switches, routers, and the like.

The master security server 112 can generate commands 142 directed to the edge node(s) 138 and/or the intermediate network nodes 140. The commands 142 can instruct the edge node(s) 138 and/or the intermediate network nodes 140 to allow or deny the data traffic 132 access to the destination(s) 134. In this manner, the master security server 112 can eliminate the distribution of the data traffic 132 that is associated with the unverified application(s) 128 to other devices such as the destination(s) 134.

Figure 2:
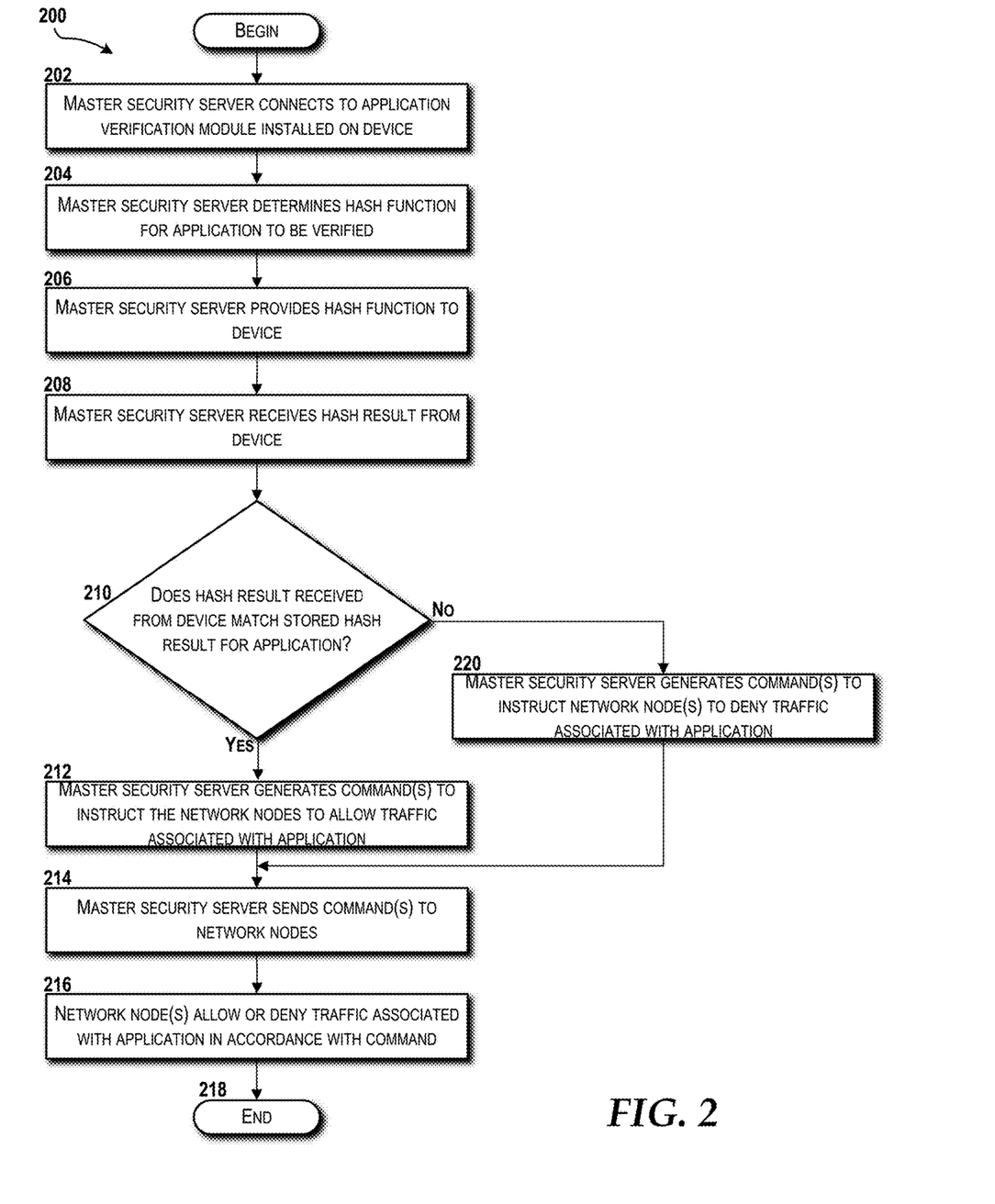
FIG. 2 is a flow diagram illustrating aspects of a method for verifying an encrypted application from the perspective of a master security server, according to an illustrative embodiment of the concepts and technologies disclosed herein.

Turning now to FIG. 2, a flow diagram illustrating aspects of a method 200 for verifying encrypted applications 106 from the perspective of the master security server 112 will be described, according to an illustrative embodiment. It should be understood that the operations of the method disclosed herein is not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the method disclosed herein can be ended at any time and need not be performed in its entirety. Some or all operations of the method, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, or a portion thereof, to perform one or more operations, and/or causing the processor to direct other components of the computing system or device to perform one or more of the operations.

For purposes of illustrating and describing the concepts of the present disclosure, operations of the methods disclosed herein are described as being performed alone or in combination via execution of one or more software modules, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 begins and proceeds to operation 202. At operation 202, the master security server 112 connects to the application verification module 108 installed on the device 104. From operation 202, the method 200 proceeds to operation 204. At operation 204, the master security server 112 determines a hash function 110 to be used for verifying an application 106 installed on the device 104. From operation 204, the method 200 proceeds to operation 206. At operation 206, the master security server 112 provides the hash function 110 to the device 104. From operation 206, the method 200 proceeds to operation 208. At operation 208, the master security server 112 receives the hash result 116 from the device 104.

From operation 208, the method 200 proceeds to operation 210. At operation 210, the master security server 112 determines whether the hash result 116 received from the device 104 matches the latest hash result 118 stored for the application 106. If the master security server 112 determines, at operation 210, that the hash result 116 received from the device 104 matches the latest hash result 118 stored for the application 106, the method 200 proceeds to operation 212. At operation 212, the master security server 112 generates the command(s) 142 directed to the edge node(s) 138 and/or the intermediate network node(s) 140, to instruct these network node(s) to allow the data traffic 132 associated with the application 106. From operation 212, the method 200 proceeds to operation 214. At operation 214, the master security server 112 sends the command(s) 142 to the edge node(s) 138 and/or the intermediate network node(s) 140. From operation 214, the method 200 proceeds to operation 216. At operation 216, the edge node(s) 138 and/or the intermediate network node(s) 140 allow or deny the data traffic 132 associated with the application 106 in accordance with the command(s) 142. From operation 216, the method 200 proceeds to operation 218. The method 200 can end at operation 218.

Returning to operation 210, if the master security server 112 determines that the hash result 116 received from the device 104 does not match the latest hash result 118 for the application 106, the method 200 proceeds to operation 220. At operation 220, the master security server 112 generates the command(s) 142 directed to the edge node(s) 138 and/or the intermediate network node(s) 140 to instruct these network node(s) to deny the data traffic 132 associated with the application 106. From operation 220, the method 200 proceeds to operation 214 and the method 200 proceeds as described above.

Figure 3:
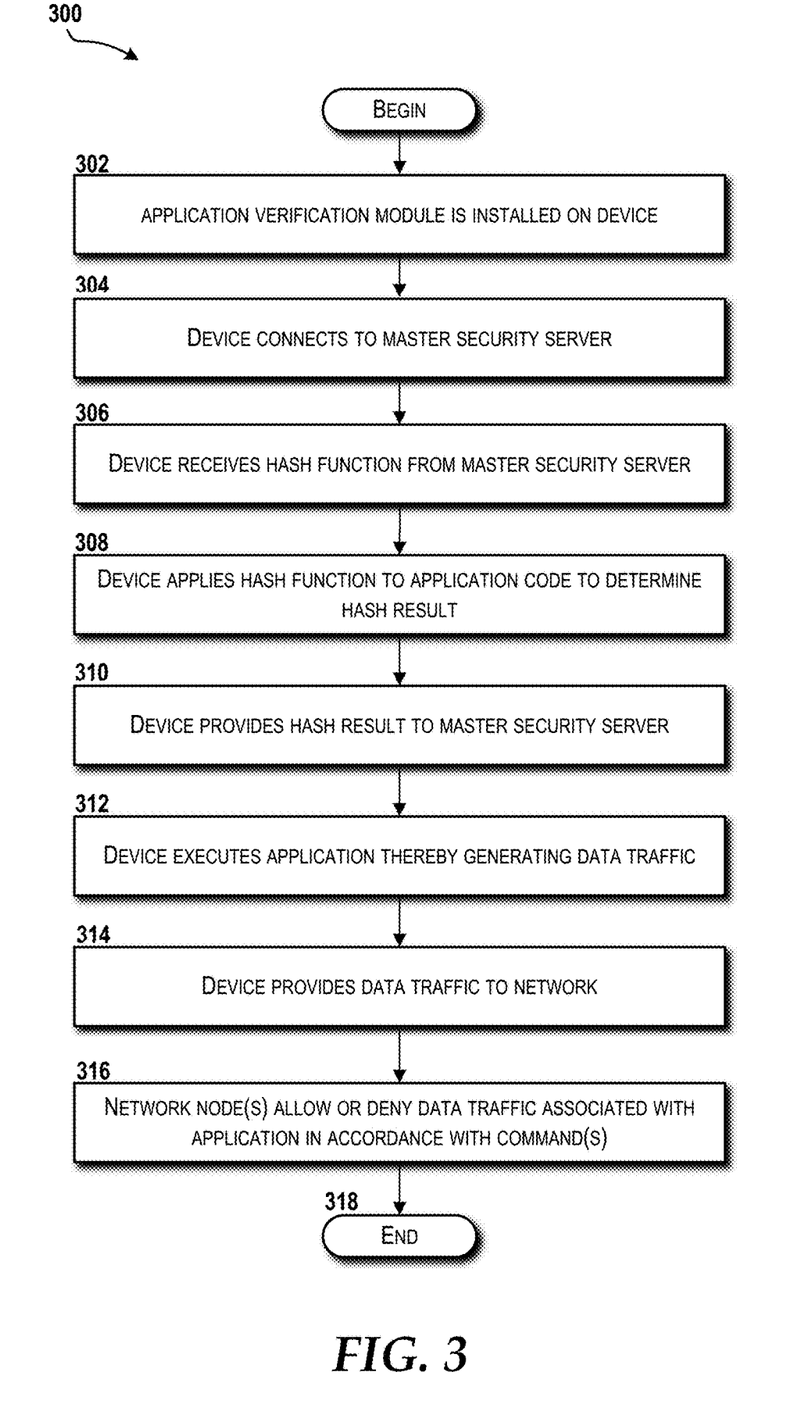
FIG. 3 is a flow diagram illustrating aspects of a method for verifying an encrypted application from the perspective of a device, according to an illustrative embodiment of the concepts and technologies disclosed herein.

Turning now to FIG. 3, a flow diagram illustrating aspects of a method 300 for verifying encrypted applications 106 from the perspective of the device 104 will be described, according to an illustrative embodiment. The method 300 begins and proceeds to operation 302. At operation 302, the application verification module 108 is installed on the device 104. In some embodiments, the application verification module 108 can be installed by a network operator prior to the device 104 being offered for sale. In some embodiments, the application verification module 108 can be installed by the device manufacturer. In some embodiments, the application verification module 108 can be part of a firmware of the device 104. In some embodiments, the application verification module 108 can be part of an operating system of the device 104.

From operation 302, the method 300 proceeds to operation 304. At operation 304, the device 104 connects to the master security server 112. From operation 304, the method 300 proceeds to operation 306. At operation 306, the device 104 receives the hash function 110 from the master security server 112. From operation 306, the method 300 proceeds to operation 308. At operation 308, the device 104 applies the hash function 110 to the application code 114 to determine the hash result 116. From operation 308, the method 300 proceeds to operation 310. At operation 310, the device 104 provides the hash result 116 to the master security server 112.

From operation 310, the method 300 proceeds to operation 312. At operation 312, the device 104 executes the application 106 thereby generating data traffic 132. From operation 312, the method 300 proceeds to operation 314. At operation 314, the device 104 provides the data traffic 132 to the network 136. From operation 314, the edge node(s) 138 and/or the intermediate network node(s) 140 allow or deny the data traffic 132 associated with the application 106 in accordance with the command(s) 142 received from the master security server 112. From operation 316, the method 300 proceeds to operation 318. The method 300 can end at operation 318.

Figure 4:
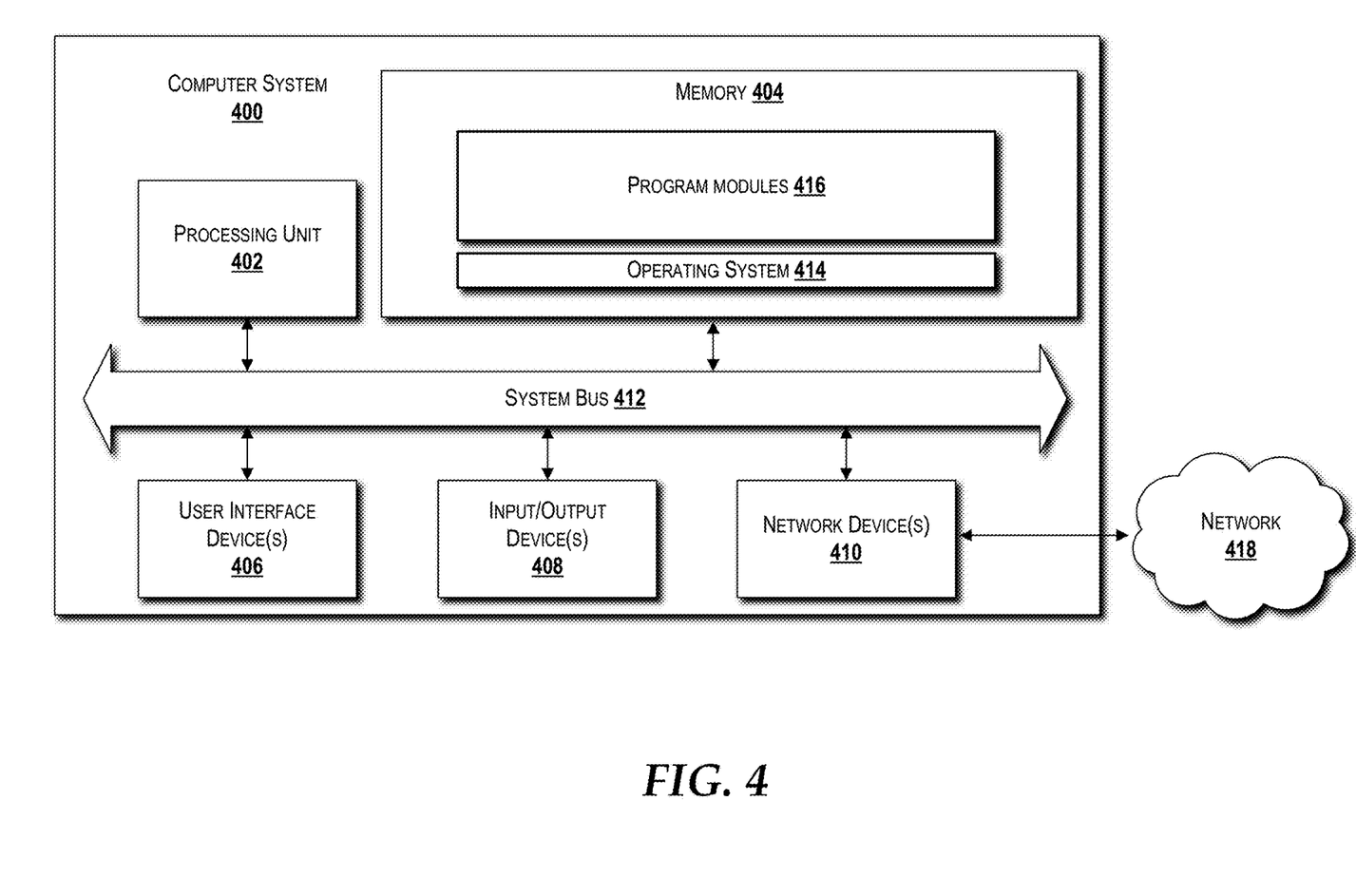
FIG. 4 is a block diagram illustrating an example computer system capable of implementing aspects of the concepts and technologies disclosed herein.

Turning now to FIG. 4, a block diagram illustrating a computer system 400 configured to provide the functionality described herein in accordance with various embodiments. In some embodiments, the device 104 can be configured the same as or similar to the computer system 400. In some embodiments, the master security server 112 can be configured the same as or similar to the computer system 400. In some embodiments, the destination(s) 134 can be configured the same as or similar to the computer system 400.

The computer system 400 includes a processing unit 402, a memory 404, one or more user interface devices 406, one or more input/output ("I/O") devices 408, and one or more network devices 410, each of which is operatively connected to a system bus 412. The bus 412 enables bi-directional communication between the processing unit 402, the memory 404, the user interface devices 406, the I/O devices 408, and the network devices 410.

The processing unit 402 may be a standard central processor that performs arithmetic and logical operations, a more specific purpose programmable logic controller ("PLC"), a programmable gate array, or other type of processor known to those skilled in the art and suitable for controlling the operation of the server computer. The processing unit 402 can be a single processing unit or a multiple processing unit that includes more than one processing component. Processing units are generally known, and therefore are not described in further detail herein.

The memory 404 communicates with the processing unit 402 via the system bus 412. The memory 404 can include a single memory component or multiple memory components. In some embodiments, the memory 404 is operatively connected to a memory controller (not shown) that enables communication with the processing unit 402 via the system bus 412. The memory 404 includes an operating system 414 and one or more program modules 416. The operating system 414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OSX, iOS, and/or families of operating systems from APPLE CORPORATION, the FREEBSD family of operating systems, the SOLARIS family of operating systems from ORACLE CORPORATION, other operating systems, and the like.

The program modules 416 may include various software and/or program modules described herein. The program modules 416 can include the application verification module 108 in an embodiment of the device 104 configured the same as or similar to the computer system 400. In some embodiments, multiple implementations of the computer system 400 can be used, wherein each implementation is configured to execute one or more of the program modules 416. The program modules 416 and/or other programs can be embodied in computer-readable media containing instructions that, when executed by the processing unit 402, perform the method 200 and/or the method 300 described herein. According to embodiments, the program modules 416 may be embodied in hardware, software, firmware, or any combination thereof. The memory 404 also can be configured to store the verified application database 122, including the latest application versions 120 and the latest hash results 118, the hash functions 110, the application code 114, the applications 106, other data disclosed herein, or a combination thereof.

By way of example, and not limitation, computer-readable media may include any available computer storage media or communication media that can be accessed by the computer system 400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 400. In the claims, the phrase "computer storage medium," "computer-readable storage medium," and variations thereof does not include waves or signals per se and/or communication media, and therefore should be construed as being directed to "non-transitory" media only.

The user interface devices 406 may include one or more devices with which a user accesses the computer system 400. The user interface devices 406 may include, but are not limited to, computers, servers, personal digital assistants, cellular phones, or any suitable computing devices. The I/O devices 408 enable a user to interface with the program modules 416. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, or an electronic stylus. Further, the I/O devices 408 may include one or more output devices, such as, but not limited to, a display or printer.

The network devices 410 enable the computer system 400 to communicate with other networks or remote systems via one or more network(s) 418, such as the network(s) 136 shown in FIG. 1. Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a Wireless Local Area Network ("WLAN") such as a WI-FI network, a Wireless Wide Area Network ("WWAN"), a Wireless Personal Area Network ("WPAN") such as BLUETOOTH, a Wireless Metropolitan Area Network ("WMAN") such as a WiMAX network, or a cellular network. Alternatively, the network 418 may be a wired network such as, but not limited to, a Wide Area Network ("WAN") such as the Internet, a Local Area Network ("LAN") such as the Ethernet, a wired Personal Area Network ("PAN"), or a wired Metropolitan Area Network ("MAN").

Figure 5:
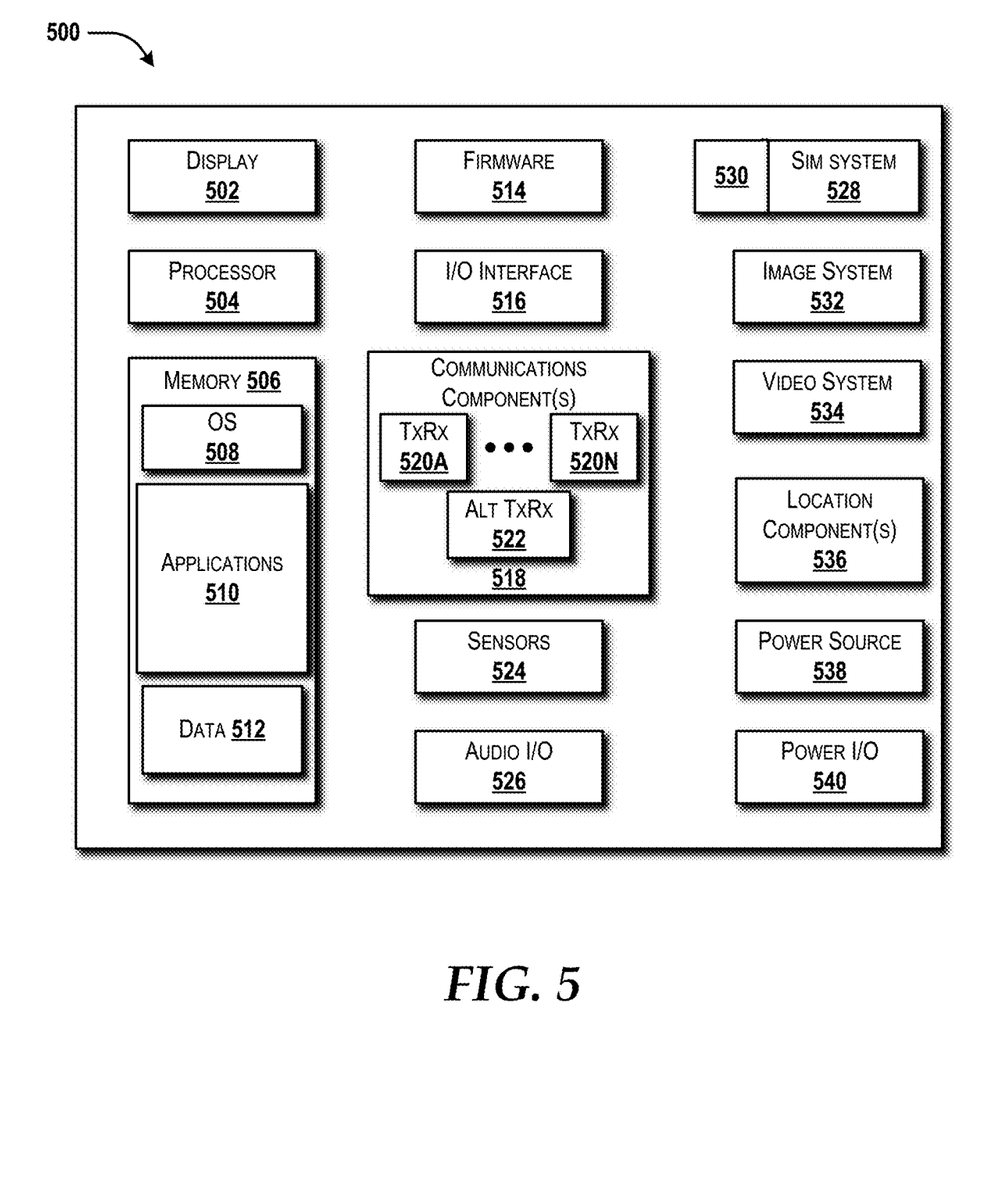
FIG. 5 is a block diagram illustrating an example mobile device capable of implementing aspects of the concepts and technologies disclosed herein.

Turning now to FIG. 5, an illustrative mobile device 500 and components thereof will be described. In some embodiments, the device 104 can be configured the same as or similar to the mobile device 500. In some embodiments, the master security server 112 can be configured the same as or similar to the mobile device 500. In some embodiments, the destination(s) 134 can be configured the same as or similar to the mobile device 500. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display various GUI elements, text, images, video, virtual keypads and/or keyboards, messaging data, notification messages, metadata, Internet content, device status, time, date, calendar data, device preferences, map and location data, combinations thereof, and/or the like. The mobile device 500 can also include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. The applications 510 can include the applications 106 (shown in FIG. 1) and the application verification module 108. In some embodiments, the applications 510 can also include a UI application (not illustrated in FIG. 5). The memory 506 can also store data 512, such as the verified application database 122, including the latest application versions 120 and the latest hash results 118, the hash functions 110, the application code 114, the application data 133, other data disclosed herein, or a combination thereof.

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE LLC, and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The firmware 514 can also store code for execution during device power up and power down operations. It can be appreciated that the firmware 514 can be stored in a volatile or non-volatile data storage device including, but not limited to, the memory 506 and/or a portion thereof.

The mobile device 500 can also include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 can also include a communications component 518. The communications component 518 can be configured to interface with the processor 504 to facilitate wired and/or wireless communications with one or more networks, such as the network 418, the Internet, or some combination thereof. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using Global System for Mobile communications ("GSM"), Code-Division Multiple Access ("CDMA") CDMAONE, CDMA2000, Long-Term Evolution ("LTE") LTE, and various other 2G, 2.5G, 3G, 4G, 4.5G, 5G, and greater generation technology standards. Moreover, the communications component 518 may facilitate communications over various channel access methods (which may or may not be used by the aforementioned standards) including, but not limited to, Time-Division Multiple Access ("TDMA"), Frequency-Division Multiple Access ("FDMA"), Wideband CDMA ("W-CDMA"), Orthogonal Frequency-Division Multiple Access ("OFDMA"), Space-Division Multiple Access ("SDMA"), and the like.

In addition, the communications component 518 may facilitate data communications using General Packet Radio Service ("GPRS"), Enhanced Data services for Global Evolution ("EDGE"), the High-Speed Packet Access ("HSPA") protocol family including High-Speed Downlink Packet Access ("HSDPA"), Enhanced Uplink ("EUL") (also referred to as High-Speed Uplink Packet Access ("HSUPA"), HSPA+, and various other current and future wireless data access standards. In the illustrated embodiment, the communications component 518 can include a first transceiver ("TxRx") 520A that can operate in a first communications mode (e.g., GSM). The communications component 518 can also include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 can also include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 can also facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 can also include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 can also include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 can also include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another device. The video and/or photo content can also be shared with other devices via various types of data transfers via wired and/or wireless communication devices as described herein.

The mobile device 500 can also include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 can also be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 can also include a power source 538. The power source 538 can include one or more batteries, power supplies, power cells, and/or other power subsystems including alternating current ("AC") and/or direct current ("DC") power devices. The power source 538 can also interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 400 described above with reference to FIG. 4. In the claims, the phrase "computer storage medium," "computer-readable storage medium," and variations thereof does not include waves or signals per se and/or communication media, and therefore should be construed as being directed to "non-transitory" media only.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
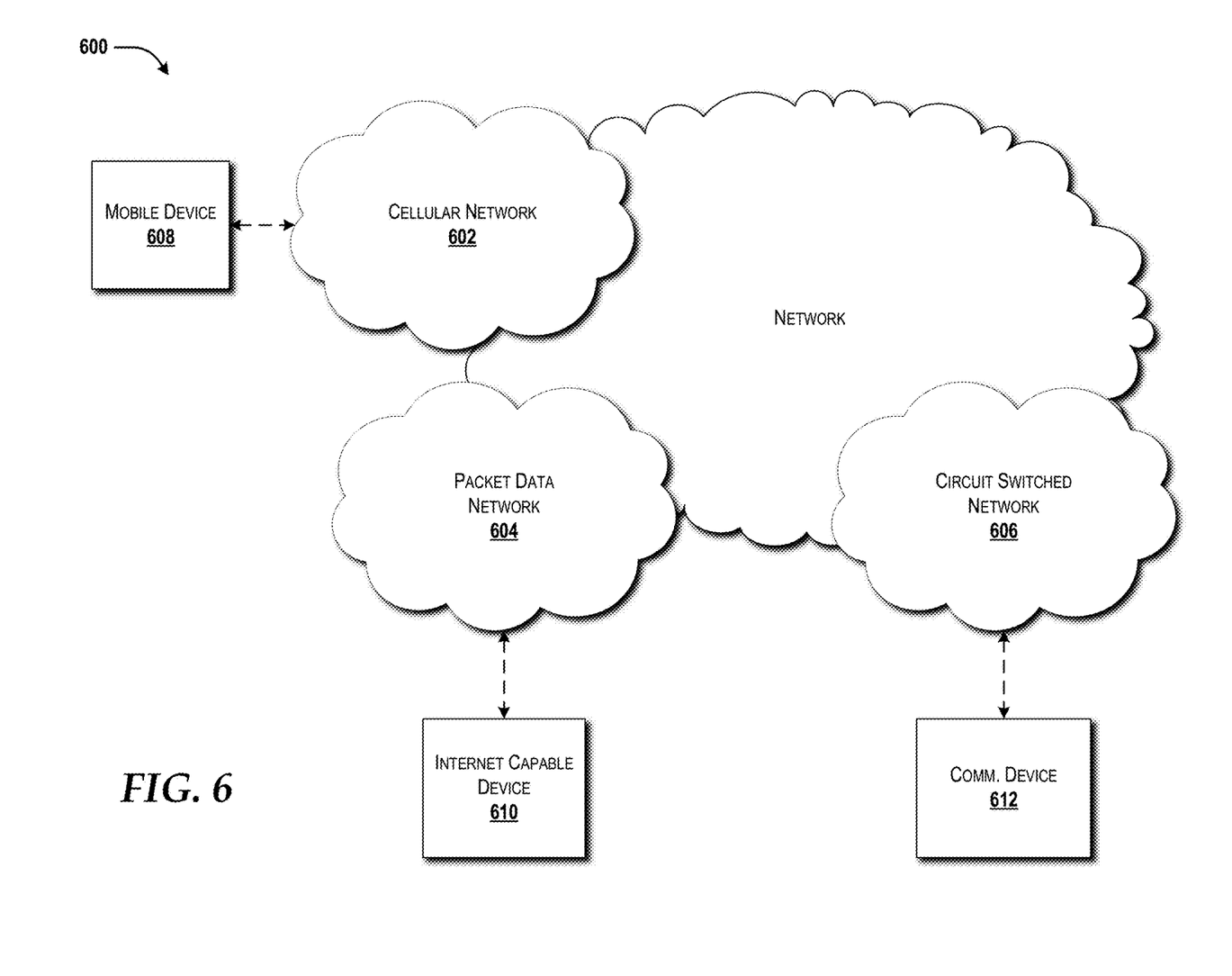
FIG. 6 is a block diagram illustrating an example network capable of implementing aspects of the concepts and technologies disclosed herein.

Turning now to FIG. 6, details of a network 600 are illustrated, according to an illustrative embodiment. In some embodiments, the network(s) 136 shown in FIG. 1 and/or the network 418 shown in FIG. 4 can be configured the same as or similar to the network 600. The network 600 includes a cellular network 602, a packet data network 604, and a circuit switched network 606 (e.g., a public switched telephone network). The cellular network 602 includes various components such as, but not limited to, base transceiver stations ("BTSs"), Node-Bs or e-Node-Bs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606.

A mobile communications device 608, such as, for example, the device 104, the destination(s) 134, the mobile device 500, a cellular telephone, a user equipment, a mobile terminal, a PDA, a laptop computer, a handheld computer, and combinations thereof, can be operatively connected to the cellular network 602. The mobile communications device 608 can be configured similar to or the same as the mobile device 500 described above with reference to FIG. 5.

The cellular network 602 can be configured as a GSM network and can provide data communications via GPRS and/or EDGE. Additionally, or alternatively, the cellular network 602 can be configured as a 3G Universal Mobile Telecommunications System ("UMTS") network and can provide data communications via the HSPA protocol family, for example, HSDPA, EUL, and HSPA+. The cellular network 602 also is compatible with mobile communications standards such as LTE, or the like, as well as evolved and future mobile standards.

The packet data network 604 includes various systems, devices, servers, computers, databases, and other devices in communication with one another, as is generally known. The device 104, the master security server 112, the destinations 134, the edge node(s) 138, the intermediate network node(s) 140, or some combination thereof can communicate with each other via the packet data network 604. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable systems/devices 610 such as the device(s) 104, the master security server 112, the destination(s) 134, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Figure 7:
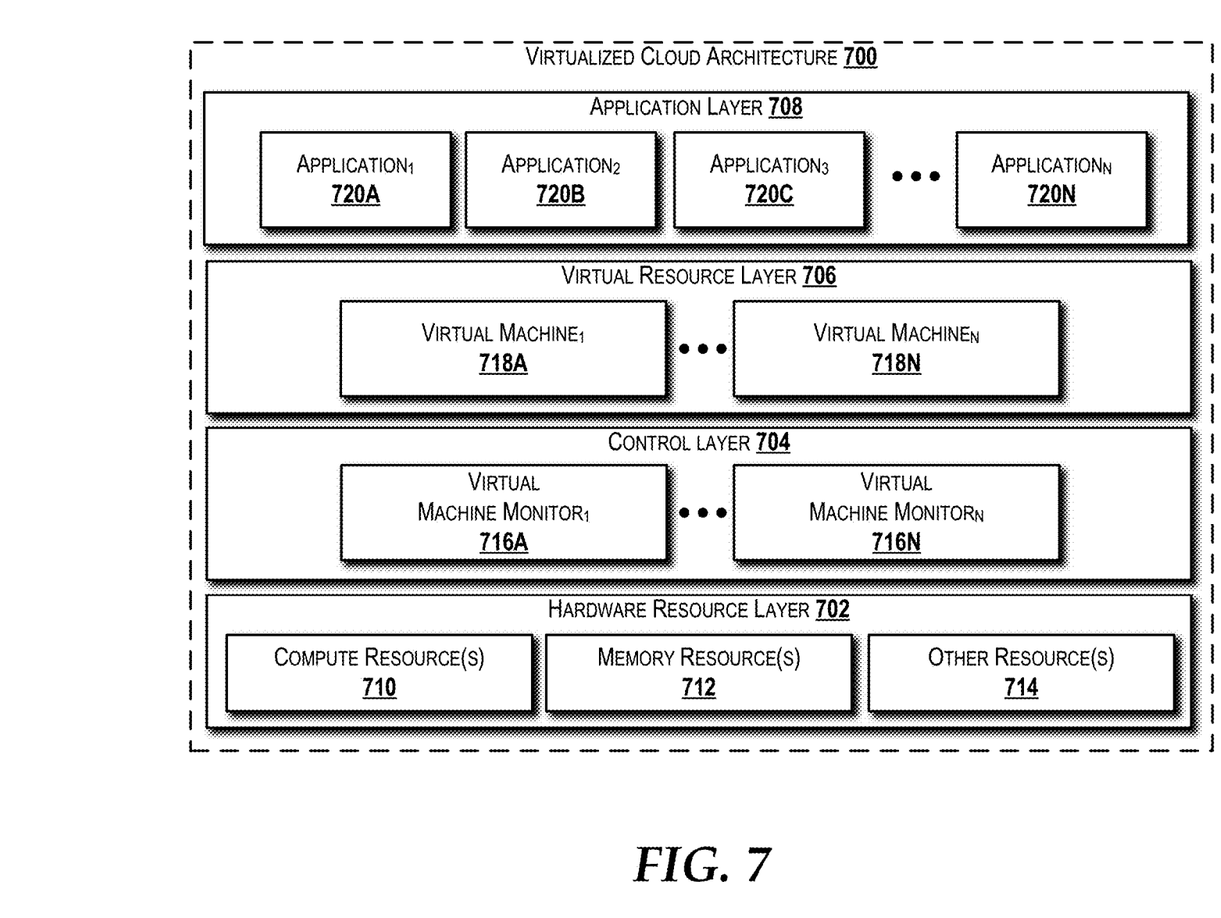
FIG. 7 is a block diagram illustrating a virtualized cloud architecture capable of implementing aspects of the concepts and technologies disclosed herein.

Turning now to FIG. 7, a block diagram illustrating an example virtualized cloud architecture 700 and components thereof will be described, according to an exemplary embodiment. In some embodiments, the virtualized cloud architecture 700 can be utilized to implement, at least in part, the master security server 112, the network(s) 136, the edge node(s) 138, the intermediate network node(s) 140, the destination(s) 134, or a portion thereof. The virtualized cloud architecture 700 is a shared infrastructure that can support multiple services and network applications. The illustrated virtualized cloud architecture 700 includes a hardware resource layer 702, a control layer 704, a virtual resource layer 706, and an application layer 708 that work together to perform operations as will be described in detail herein.

The hardware resource layer 702 provides hardware resources, which, in the illustrated embodiment, include one or more compute resources 710, one or more memory resources 712, and one or more other resources 714. The compute resource(s) 710 can include one or more hardware components that perform computations to process data, and/or to execute computer-executable instructions of one or more application programs, operating systems, and/or other software. The compute resources 710 can include one or more central processing units ("CPUs") configured with one or more processing cores. The compute resources 710 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 710 can include one or more discrete GPUs. In some other embodiments, the compute resources 710 can include CPU and GPU components that are configured in accordance with a co-processing CPU/GPU computing model, wherein the sequential part of an application executes on the CPU and the computationally-intensive part is accelerated by the GPU. The compute resources 710 can include one or more system-on-chip ("SoC") components along with one or more other components, including, for example, one or more of the memory resources 712, and/or one or more of the other resources 714. In some embodiments, the compute resources 710 can be or can include one or more SNAPDRAGON SoCs, available from QUALCOMM; one or more TEGRA SoCs, available from NVIDIA; one or more HUMMINGBIRD SoCs, available from SAMSUNG; one or more Open Multimedia Application Platform ("OMAP") SoCs, available from TEXAS INSTRUMENTS; one or more customized versions of any of the above SoCs; and/or one or more proprietary SoCs. The compute resources 710 can be or can include one or more hardware components architected in accordance with an advanced reduced instruction set computing ("RISC") machine ("ARM") architecture, available for license from ARM HOLDINGS. Alternatively, the compute resources 710 can be or can include one or more hardware components architected in accordance with an x86 architecture, such an architecture available from INTEL CORPORATION of Mountain View, California, and others. Those skilled in the art will appreciate the implementation of the compute resources 710 can utilize various computation architectures, and as such, the compute resources 710 should not be construed as being limited to any particular computation architecture or combination of computation architectures, including those explicitly disclosed herein.

The memory resource(s) 712 can include one or more hardware components that perform storage operations, including temporary or permanent storage operations. In some embodiments, the memory resource(s) 712 include volatile and/or non-volatile memory implemented in any method or technology for storage of information such as computer-readable instructions, data structures, program modules, or other data disclosed herein. In implementations of the master security server 112 on the virtualized cloud architecture 700, the memory resource(s) 712 can store the verified application database, including the latest application versions and the latest application hashes, the hash functions, the application data, or a combination thereof.

Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 710.

The other resource(s) 714 can include any other hardware resources that can be utilized by the compute resources(s) 710 and/or the memory resource(s) 712 to perform operations described herein. The other resource(s) 714 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resource layer 702 can be virtualized by one or more virtual machine monitors ("VMMs") 716A-716N (also known as "hypervisors;" hereinafter "VMMs 716") operating within the control layer 704 to manage one or more virtual resources that reside in the virtual resource layer 706. The VMMs 716 can be or can include software, firmware, and/or hardware that alone or in combination with other software, firmware, and/or hardware, manages one or more virtual resources operating within the virtual resource layer 706.

The virtual resources operating within the virtual resource layer 706 can include abstractions of at least a portion of the compute resources 710, the memory resources 712, the other resources 714, or any combination thereof. These abstractions are referred to herein as virtual machines ("VMs"). In the illustrated embodiment, the virtual resource layer 706 includes VMs 718A-718N (hereinafter "VMs 718"). Each of the VMs 718 can execute one or more applications 720A-720N in the application layer 708.

Based on the foregoing, it should be appreciated that aspects of encrypted application verification have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

The invention claimed is:

1. A method comprising:
receiving, by a device comprising a processor executing an application verification module, a hash function from a master security server, wherein the hash function is used to verify an application installed on the device;
applying, by the device, the hash function to application code of the application to determine a hash result;
providing, by the device, the hash result to the master security server, wherein the master security server determines whether the application is verified by comparing the hash result to a stored hash result determined, by the master security server, by applying the hash function to a latest version of the application stored on the master security server;
in response to a determination by the master security server that the application is unverified, receiving, by the device, a notification from the master security server, wherein the notification comprises instructions for the device to automatically delete the application, and wherein the master security server sends a command to a network node instructing the network node to deny data traffic originating from the application to a destination; and
in response to the notification, automatically deleting, by the device, the application from the device.

2. The method of claim 1, further comprising receiving, by the device, a second hash function from the master security server.

3. The method of claim 2, wherein the second hash function replaces the hash function.

4. The method of claim 2, wherein the second hash function is used to verify a second application installed on the device, and wherein the method further comprises:

applying, by the device, the second hash function to second application code of the second application to determine a second hash result;
providing, by the device, the second hash result to the master security server, wherein the master security server determines whether the second application is verified based upon the second hash result;
executing, by the device via the processor, the second application thereby generating data traffic to be sent via a network to a destination; and
providing, by the device, the data traffic generated by the second application to the network, wherein a network node receives the data traffic generated by the second application and allows or denies the data traffic generated by the second application access to the destination based upon a command associated with the second application received from the master security server.

5. The method of claim 1, wherein the hash function is periodically updated by the master security server.

6. The method of claim 1, wherein the device comprises an Internet of Things device, a smartphone, or a computer.

7. A method comprising:
determining, by a master security server comprising a processor, a hash function to verify an application installed on a device, wherein the device also has an application verification module installed thereon;
providing, by the master security server, the hash function to the device, whereby the application verification module applies the hash function to application code of the application to determine a hash result;
comparing, by the master security server, the hash result to a stored hash result determined, by the master security server, by applying the hash function to a latest version of the application stored on the master security server to determine, by the master security server, whether the hash result received from the device matches the stored hash result for the latest version of the application;
in response to determining that the hash result received from the device does not match the stored hash result for the latest version of the application,
generating, by the master security server, a command directed to a network node, wherein the command instructs the network node to deny data traffic originating from the application to a destination, and
generating, by the master security server, a notification directed to the device, wherein the notification instructs the device to automatically delete the application installed on the device from the device; and
providing, by the master security server, the notification to the device.

8. The method of claim 7, further comprising:
determining, by the master security server, a second hash function; and
providing, by the master security server, the second hash function to the device.

9. The method of claim 8, wherein the second hash function replaces the hash function, whereby the application verification module applies the second hash function to the application code of the application to determine a second hash result.

10. The method of claim 8, wherein the second hash function is used to verify a second application installed on the device.

11. The method of claim 7, further comprising periodically updating the hash function.

12. A computer-readable storage medium comprising computer-executable instructions that, when executed by a processor of a device, cause the processor to perform operations comprising:
    receiving a hash function from a master security server, wherein the hash function is used to verify an application installed on the device;
    applying the hash function to application code of the application to determine a hash result;
    providing the hash result to the master security server, wherein the master security server determines whether the application is verified by comparing the hash result to a stored hash result determined, by the master security server, by applying the hash function to a latest version of the application stored on the master security server;
    in response to a determination by the master security server that the application is unverified, receiving a notification from the master security server, wherein the notification comprises instructions for the device to automatically delete the application, and wherein the master security server sends a command to a network node instructing the network node to deny data traffic originating from the application to a destination; and
    in response to the notification, automatically deleting the application from the device.

13. The computer-readable storage medium of claim 12, wherein the operations further comprise receiving a second hash function from the master security server.

14. The computer-readable storage medium of claim 13, wherein the second hash function is used to verify a second application installed on the device.

15. The computer-readable storage medium of claim 14, wherein the operations further comprise:
    applying the second hash function to second application code of the second application to determine a second hash result;
    providing the second hash result to the master security server, wherein the master security server determines whether the second application is verified based upon the second hash result;
    executing the second application thereby generating data traffic to be sent via a network to a destination; and
    providing, by the device, the data traffic generated by the second application to the network, wherein a network node receives the data traffic generated by the second application and allows or denies the data traffic generated by the second application access to the destination based upon a command associated with the second application received from the master security server.

16. The computer-readable storage medium of claim 13, wherein the second hash function replaces the hash function.

17. The computer-readable storage medium of claim 12, wherein the hash function is periodically updated by the master security server.

18. The computer-readable storage medium of claim 12, wherein the device comprises a smartphone.

19. The computer-readable storage medium of claim 12, wherein the device comprises a computer.

* * * * *